(12) United States Patent
Yamada et al.

(10) Patent No.: US 8,456,604 B2
(45) Date of Patent: Jun. 4, 2013

(54) LIQUID CRYSTAL DEVICE AND PROJECTOR

(75) Inventors: Shuhei Yamada, Chino (JP); Shohei Yoshida, Shimo-suwa (JP); Takeshi Seto, Chofu (JP)

(73) Assignee: Seiko Epson Corporation, Tokyo (JP)

( * ) Notice: Subject to any disclaimer, the term of this patent is extended or adjusted under 35 U.S.C. 154(b) by 1149 days.

(21) Appl. No.: 11/531,104

(22) Filed: Sep. 12, 2006

(65) Prior Publication Data

US 2007/0109236 A1   May 17, 2007

(30) Foreign Application Priority Data

Nov. 16, 2005   (JP) .................................. 2005-331101

(51) Int. Cl.
*G02F 1/1333*   (2006.01)
*G02F 1/1339*   (2006.01)

(52) U.S. Cl.
USPC ........................................... 349/153; 349/86

(58) Field of Classification Search
USPC .................................................. 349/153, 86
See application file for complete search history.

(56) References Cited

U.S. PATENT DOCUMENTS

| | | | |
|---|---|---|---|
| 4,976,516 A | 12/1990 | Carrington | |
| 6,100,953 A * | 8/2000 | Kim et al. | 349/129 |
| 6,717,637 B1 * | 4/2004 | Yoon et al. | 349/106 |
| 2004/0119071 A1 * | 6/2004 | Takahara | 257/59 |

FOREIGN PATENT DOCUMENTS

| | | |
|---|---|---|
| JP | U-60-74128 | 5/1985 |
| JP | A-62-150322 | 7/1987 |
| JP | A-62-217222 | 9/1987 |
| JP | A-2-23318 | 1/1990 |
| JP | A-02-157819 | 6/1990 |
| JP | A-2-157819 | 6/1990 |
| JP | A-3-25415 | 2/1991 |
| JP | A-3-107128 | 5/1991 |
| JP | A 6-082799 | 3/1994 |
| JP | A-06-202122 | 7/1994 |
| JP | A-8-278474 | 10/1996 |
| JP | 2002250970 A * | 9/2002 |
| JP | A-2003-066472 | 3/2003 |

* cited by examiner

*Primary Examiner* — Brian Healy
*Assistant Examiner* — Erin Chiem
(74) *Attorney, Agent, or Firm* — Oliff & Berridge, PLC

(57) ABSTRACT

A liquid crystal device includes a pair of substrates, a liquid crystal disposed between the pair of substrates, and a seal member disposed around the liquid crystal, wherein a liquid crystal storage portion is disposed in the inner circumference of the seal member by forming a concave portion on the substrate.

10 Claims, 9 Drawing Sheets

LIQUID CRYSTAL DEVICE AND PROJECTOR

BACKGROUND

1. Technical Field

The present invention relates to a liquid crystal device and a projector.

2. Related Art

A projection display device such as a projector is widely used. The projector separates a beam emitted from a light source into different color beams, modulates the separated color beams to generate color image beams, and combines the color image beams to generate a color image, thereby enlarging and projecting the color image onto a screen. The projector includes a light modulator for modulating the separated color beams to generate the color image beams.

A liquid crystal light valve including a liquid crystal device is used for the light modulator. The liquid crystal device includes a seal member disposed in the circumferential portion between a pair of substrates and a liquid crystal encapsulated in an area surrounded with the seal member. Electrodes for applying a voltage to the liquid crystal are provided on the inner surfaces of the pair of substrates. By driving the liquid crystal with application of a voltage across the pair of substrates, it is possible to modulate transmittance of incident light in a unit of a pixel. Accordingly, it is possible to generate the color image beams.

However, in the projector described above, it is necessary to emit a high-intensity beam from the light source in order to secure brightness of the color image enlarged and projected onto the screen. When the high-intensity beam is incident onto a light modulation area of the liquid crystal device, the quality of the liquid crystal deteriorates due to the decomposition or polymerization of the liquid crystal. As a result, the light modulation characteristic of the liquid crystal device changes, and the reliability of the projector is deteriorated.

In addition, JP-A-6-082799 discloses a technology in which impurities are forcibly transferred into a liquid crystal material by heating a liquid crystal panel after performing a liquid crystal injecting process and new liquid crystal is supplied through an injection hole at one side while discharging dirty liquid crystal through an injection hole at the other side, thereby removing impurities existing in the panel. However, the technology disclosed in JP-A-6-082799 cannot cope with deterioration of the liquid crystal due to the use of the projector.

SUMMARY

An advantage of some aspect of the invention is that is provides a liquid crystal device and a projector, in which the reliability of the projector is enhanced by elongating the time until the entire liquid crystal is deteriorated.

According to an aspect of the invention, there is provided a liquid crystal device comprising a pair of substrates; a liquid crystal disposed between the pair of substrates; and a seal member disposed around the liquid crystal, wherein a liquid crystal storage portion is disposed in the inner circumference of the seal member by forming a concave portion on the substrate.

According to the aspect of the invention, it is possible to increase the amount of the liquid crystal encapsulated in the liquid crystal device 100. In addition, since the liquid crystal heated by intense light or heat in a light modulation area and the liquid crystal filled in a liquid crystal storage portion are interchanged by heat conduction or vibrations, it is possible to distribute the amount of light and heat transmitted to the liquid crystal. Therefore, it is possible to elongate the time until the entire liquid crystal is deteriorated.

Further, it is preferable that the liquid crystal storage portion is formed on the circumferential portion of an area surrounded with the seal member.

In particular, it is preferable that the liquid crystal storage portion is formed on a partition part of the circumferential portion of an area surrounded with the seal member.

At the circumferential portion of the area surrounded with the seal member, there is formed a partition part having a broad width which is not used for the light modulation. Therefore, it is possible to secure the volume of the liquid crystal storage portion and increase the amount of the liquid crystal encapsulated in the liquid crystal device, by forming the concave portion on the partition part having a broad width.

Further, it is preferable that the liquid crystal device comprises a pixel area having pixel electrodes formed thereon and the liquid crystal storage portion is formed on a peripheral area of the pixel area.

In the liquid crystal device described above, it is possible to increase the amount of the liquid crystal encapsulated in the liquid crystal device. In addition, since the liquid crystal disposed in the light modulation area and the liquid crystal filled in the liquid crystal storage portion are interchanged therebetween, it is possible to elongate the time until the entire liquid crystal is deteriorated.

Further, it is preferable that the liquid crystal storage portion is formed at a position overlapping a light blocking film formed on the substrate.

According to the aspect of the invention, it is possible to prevent the optical leakage by the disclination of the orientation of the liquid crystal disposed in the liquid crystal storage portion and increase the amount of the liquid crystal encapsulated in the liquid crystal device.

Further, it is preferable that the side surface of the concave portion intersects a normal line of the substrate. Further, it is preferable that the concave portion extends in a groove shape and the concave portion has an approximately triangular section when taken along a plane perpendicular to the extending direction of the concave portion.

According to the aspect of the invention, it is possible to enhance step coverage of functional films formed on the concave portion. In addition, it is possible to reduce the misalignment of the liquid crystal in the liquid crystal storage portion and suppress the optical leakage.

Further, it is preferable that a stirring device that stirs the liquid crystal is provided on the substrate.

According to the aspect of the invention, it is possible to expedite interchanging of the liquid crystal heated by intense light or heat in the light modulation area and the liquid crystal filled in the liquid crystal storage portion. Accordingly, it is possible to distribute the amount of light and heat transmitted to the liquid crystal and to elongate the time until the entire liquid crystal is deteriorated.

Further, it is preferable that the stirring device is a piezoelectric device.

According to the aspect of the invention, it is possible to form a high precision stirring device in a simple manner.

Further, it is preferable that the liquid crystal device further comprises a deterioration determining device that determines the degree of deterioration of the liquid crystal and controlling the stirring device on the basis of the determination result.

According to the aspect of the invention, it is possible to efficiently operate the stirring device in accordance with the degree of deterioration of the liquid crystal.

Further, it is preferable that the deterioration determining device determines the degree of deterioration of the liquid crystal by detecting an occurrence of a flicker.

As the liquid crystal deteriorates, the voltage holding ratio decreases and a flicker (blinking of an image) is apt to occur. Therefore, it is possible to determine the degree of deterioration of the liquid crystal by detecting the occurrence of a flicker.

Further, it is preferable that the deterioration determining device outputs driving signals having a frame period longer than that of an image display frame.

According to the aspect of the invention, it is possible to detect the occurrence of the flicker before the flicker occurs at the time of displaying an image.

According to an aspect of the invention, there is provided a projector including the liquid crystal device described above.

According to the aspect of the invention, since the projector includes a liquid crystal device capable of extending the time until the entire liquid crystal is deteriorated, it is possible to suppress variations in the light modulation characteristic of the liquid crystal device and enhance the reliability of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to drawings. In addition, the following drawings are drawn on different scales for each layer or member in order to recognize each layer or member in each drawing. In the specification, surfaces of elements in the liquid crystal device on which a liquid crystal is disposed will be referred to as an inner side and the opposite surfaces will be referred to as an outer side. In addition, terms, "at the time of application of a non-selection voltage application" and "at the time of application of a selection voltage", respectively, mean "when the application voltage to the liquid crystal is near the threshold voltage of the liquid crystal" and "when the application voltage to the liquid crystal is sufficiently greater than the threshold voltage of the liquid crystal".

Projector

Figure 1:
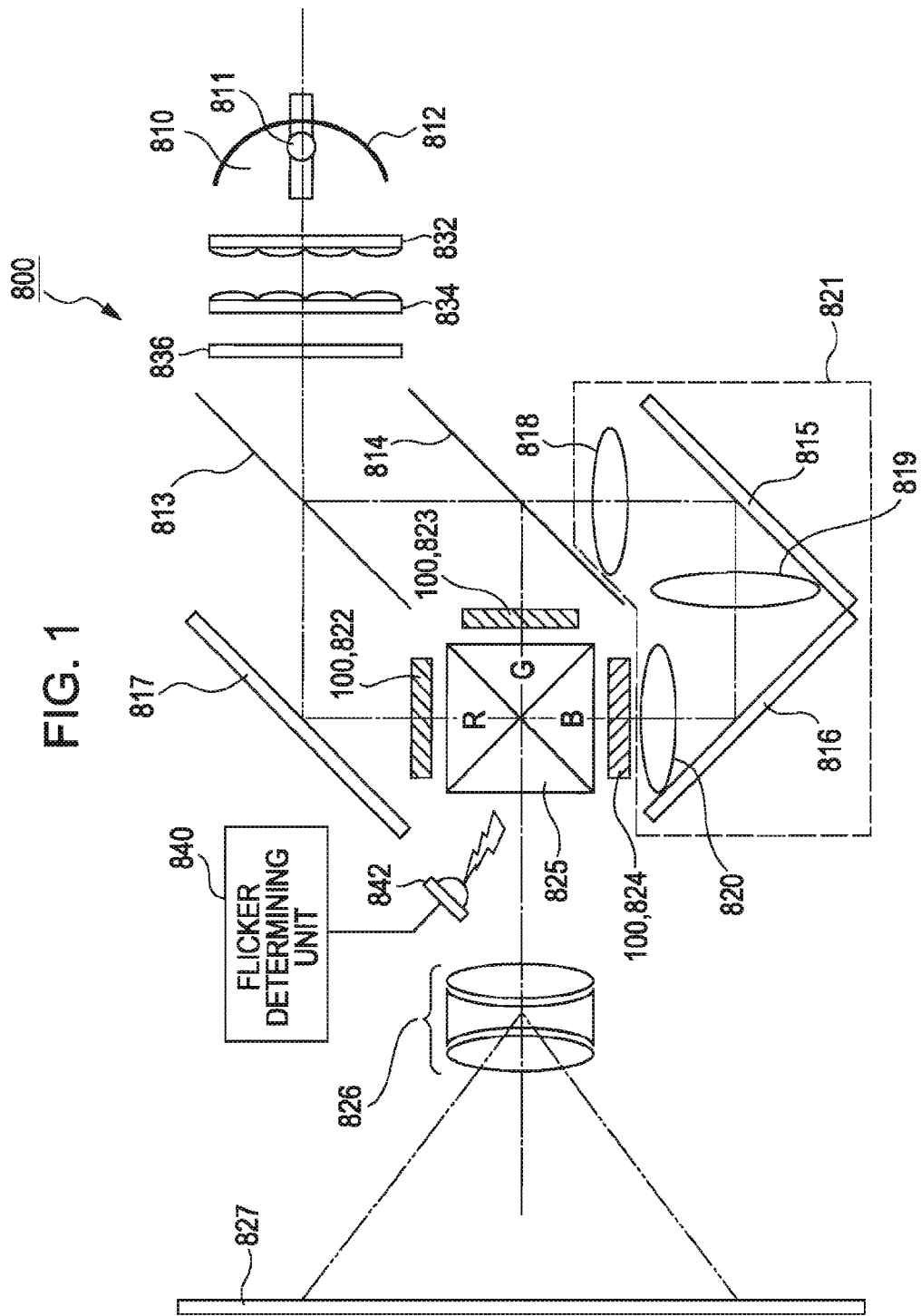
FIG. 1 is a schematic view showing a structure of a projector.

Hereinafter, a projector will be described with reference to FIG. 1. FIG. 1 is a schematic view showing a construction of the projector.

A light source 810 includes a light source lamp 811 such as a halogen lamp, a metal halide lamp, a pressurized mercury lamp, or the like and a concave mirror 812 collimating light emitted from the light source lamp 811 into a bundle of light fluxes approximately parallelized to each other. On downstream of the light source 810, there are provided a first and second lens array 832 and 834 formed by arranging micro lenses having an approximately rectangular shape in a matrix form. The first lens array 832 separates the collimated light flux emitted from the light source 810 into a plurality of partial rays so as to form an image near the second lens array 834. The second lens array 834 has a function of aligning the center axis of the partial light flux incident from the first lens array in a direction perpendicular to light modulators 822, 823, and 824. On downstream of the first lens array 834, there is provided a polarization converting device 836 which converts incident light flux into linear polarized light (for example, s-polarized light or p-polarized light) and outputs the linear polarized light.

The light output from the polarization converting device 836 is incident onto a dichroic mirror 813. The dichroic mirror 813 has a function of reflecting green light and blue light included in white light from the light source lamp 811 and transmitting red light. The light transmitted from the dichroic mirror 813 is reflected from a reflecting mirror 817 and incident onto the light modulator 822 for the red light. On the other hand, the green light and the blue light reflected from the dichroic mirror 813 are incident onto a dichroic mirror 814. The dichroic mirror 814 has a unction of transmitting blue light and reflecting green light. The green light reflected from the dichroic mirror 814 is incident onto the light modulator 823 for the green light. On the other hand, the blue light transmitted from the dichroic mirror 814 is incident onto the light modulator 824 for the blue light through a light guiding portion 821. The light guiding portion 821 is formed of a relay lens system including an input lens 818, a relay lens 819, and an output lens 820 and has a function of preventing an optical loss for the blue light due to a long light path.

For the light modulators 822, 823, and 824, there is used a liquid crystal light valve including a liquid crystal device 100 for modulating a transmission ratio of incident light for each pixel, polarization plates interposing the liquid crystal device 100 therebetween, and a retardation film. The liquid crystal light valve forms color image beams. A detailed structure of the liquid crystal device 100 will be described later.

The image beams for each color output from the light modulators 822, 823, and 824 are incident onto a cross dichroic prism 825. The cross dichroic prism 825 is formed by bonding four rectangular prisms. On the bonding surface, there are formed a dielectric multi-layered film reflecting the red light and a dielectric multi-layered film for reflecting the blue light in an X-shape. The dielectric multi-layered films combine the image beams for each color so as to generate color image beams.

The color image beams are enlarged and projected onto a screen 827 by a projecting lens 826 as a protecting optical system. As a result, a color image is displayed on the screen 827.

Liquid Crystal Device

Hereinafter, the liquid crystal device forming the light modulator will be described.

Figure 2A:
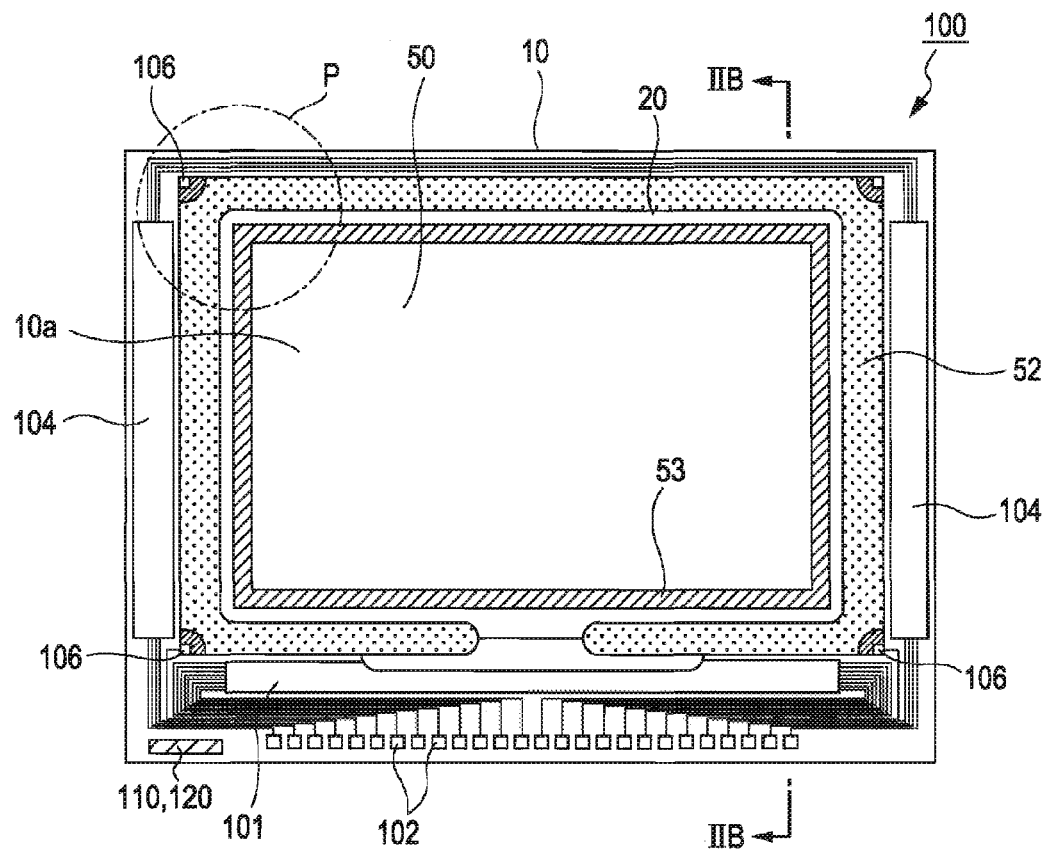
FIG. 2 is a schematic view of a liquid crystal device.
Figure 2B:
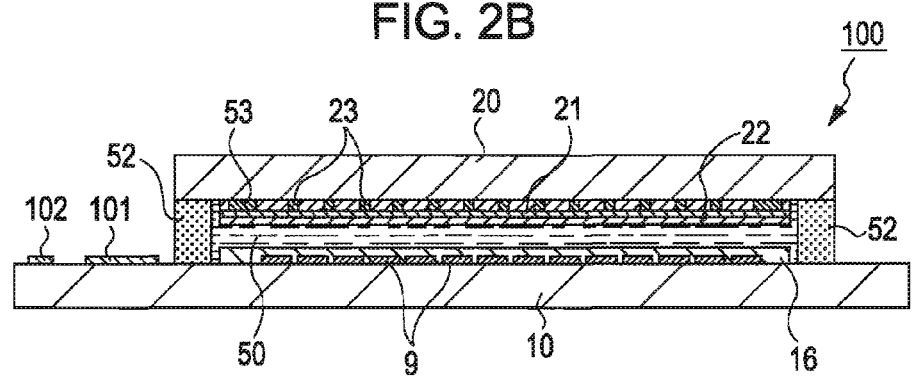

FIG. 2A is a plan view showing components of the liquid crystal device seen from a counter substrate and FIG. 2B is a side sectional view taken along IIH-IIH' line of FIG. 2A. The liquid crystal device 100 includes a pair of substrates 10 and 20, a liquid crystal 50 disposed at a light modulation area 10a between the pairs of substrates 10 and 20, and a seal member 52 disposed around the liquid crystal 50 so as to fix the pair of substrates 10 and 20.

As shown in FIG. 2B, the liquid crystal device 100 includes a TFT array substrate 10 (will be referred to "element substrate") and a counter substrate 20. In order to bond the pair of substrates 10 and 20, there is provided a seal member 52 in the circumferential portion between the pair of substrates 10 and 20. The seal member 52 is made of a heat-curing resin such as an epoxy and a UV curing resin such as an acryl. Disposition of the seal member 52 starts from applying a liquid seal member onto one of the substrates 10 and 20 by using a screen printing method or a dispenser drawing method. Thereafter, the substrates 10 and 20 are superimposed onto each other and the seal member 52 is cured by heating or UV radiation, thereby bonding the substrates 10 and 20.

As shown in FIG. 2A, on a peripheral circuit area of the element substrate 10 outside the seal member 52, there are formed a data signal driving circuit 101 and outer circuit mounting terminal 102 along one side of the element substrate 10 and a scan signal driving circuit 104 along two sides of the element substrate 10 adjacent to the one side thereof. On corners of the counter substrate 20, there is provided a substrate connecting member 106 providing an electrical connection between the element substrate 10 and the counter substrate 20.

The liquid crystal 50 is encapsulated in an area surrounded with the seal member 52 between the pair of substrates 10 and 20. The encapsulation of the liquid crystal 50 is performed by injecting the liquid crystal 50 from an inlet provided at a portion of the seal member 52 while vacuuming the area surrounded with the seal member 52. Alternatively, the encapsulation of the liquid crystal 50 may be performed by applying a liquid seal member onto the entire circumference of the one substrate, applying the liquid crystal 50 onto the area surrounded with the seal member 52, and thereafter superimposing the substrates 10 and 20 to each other, thereby curing the seal member 52.

A light modulation area 10a is formed within the area surrounded with the seal member 52. A detailed structure of the light modulation area 10a will be described later.

Equivalent Circuit

Figure 3:
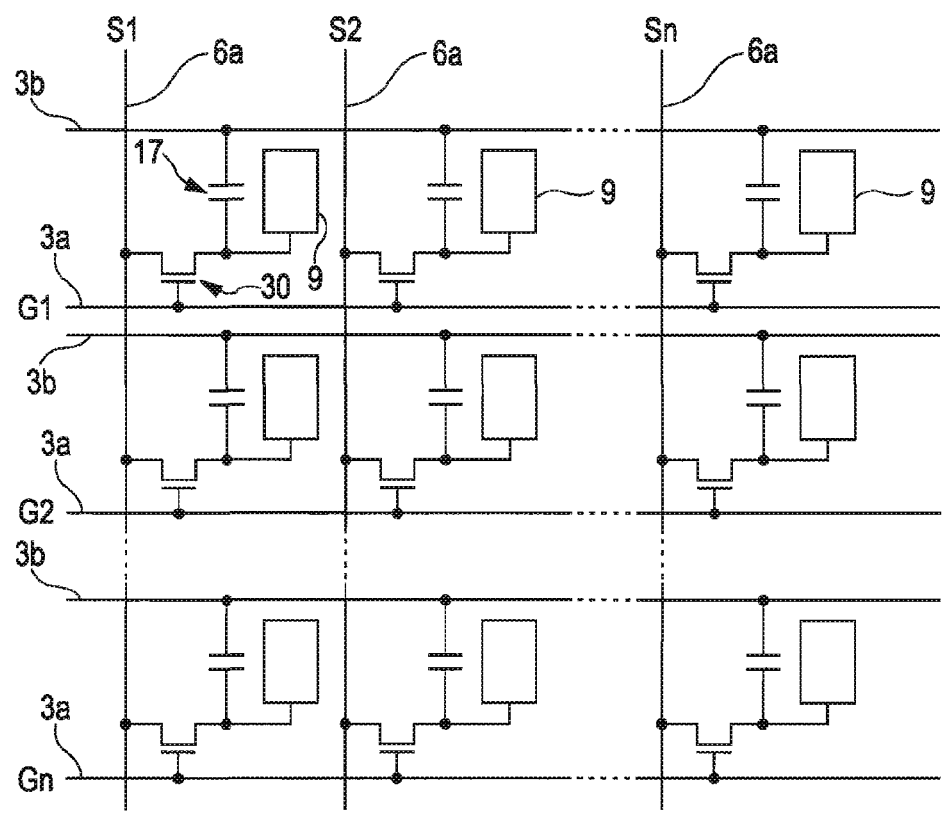
FIG. 3 is an equivalent circuit of the liquid crystal device.

FIG. 3 is an equivalent circuit of the liquid crystal device. On the light modulation area 10a of a transmissive liquid crystal device, a plurality of pixel electrodes 9 is formed in a matrix form. At circumference of each pixel electrode 9, there is formed a TFT element 30 as a switching element for controlling electrical connectivity to the pixel electrode 9. The source of the TFT element 30 is electrically connected to data lines 6a. The data lines 6a are supplied with image signals S1, S2, ..., and Sn.

The image signals S1, S2, ..., and Sn may be supplied to each of the data lines 6a in a line-sequential manner in this order and supplied to a group of data lines 6a adjacent to each other. The gate of the TFT element 30 is connected to scan lines 3a. The scan lines 3a are supplied with scan signals G1, G2, ..., and Gm by driving pluses at a predetermined timing. The scan signals G1, G2, ..., and Gm are applied to each of the scan lines 3a in a line-sequential manner in this order. The drain of the TFT element 30 is electrically connected to the pixel electrodes 9. When the TFT elements 30 as switching elements are turned on for a predetermined period by the scan signals G1, G2, ..., and Gm supplied from the scan lines 3a, the image signals S1, S2, ..., and Sn supplied from the data lines 6a are recorded onto the liquid crystals of the pixels at a predetermined timing.

The image signals S1, S2, ..., and Sn having a predetermined level and recorded onto the liquid crystal are maintained at a liquid crystal capacity formed between the pixel electrode 9 and a common electrode described below for a predetermined period. In order to prevent a leakage of the maintained image signals S1, S2, ..., and Sn, there are formed a storage capacitor 17 between the pixel electrode 9 and a capacitor line 3b in parallel with the liquid crystal capacitor. In this way, when a voltage signal is applied to the liquid crystal, the orientation of the liquid crystal is changed in accordance with the applied voltage level. With this arrangement, it is possible to modulate light incident onto the liquid crystal and display a gradient image.

Planer Structure

Figure 4:
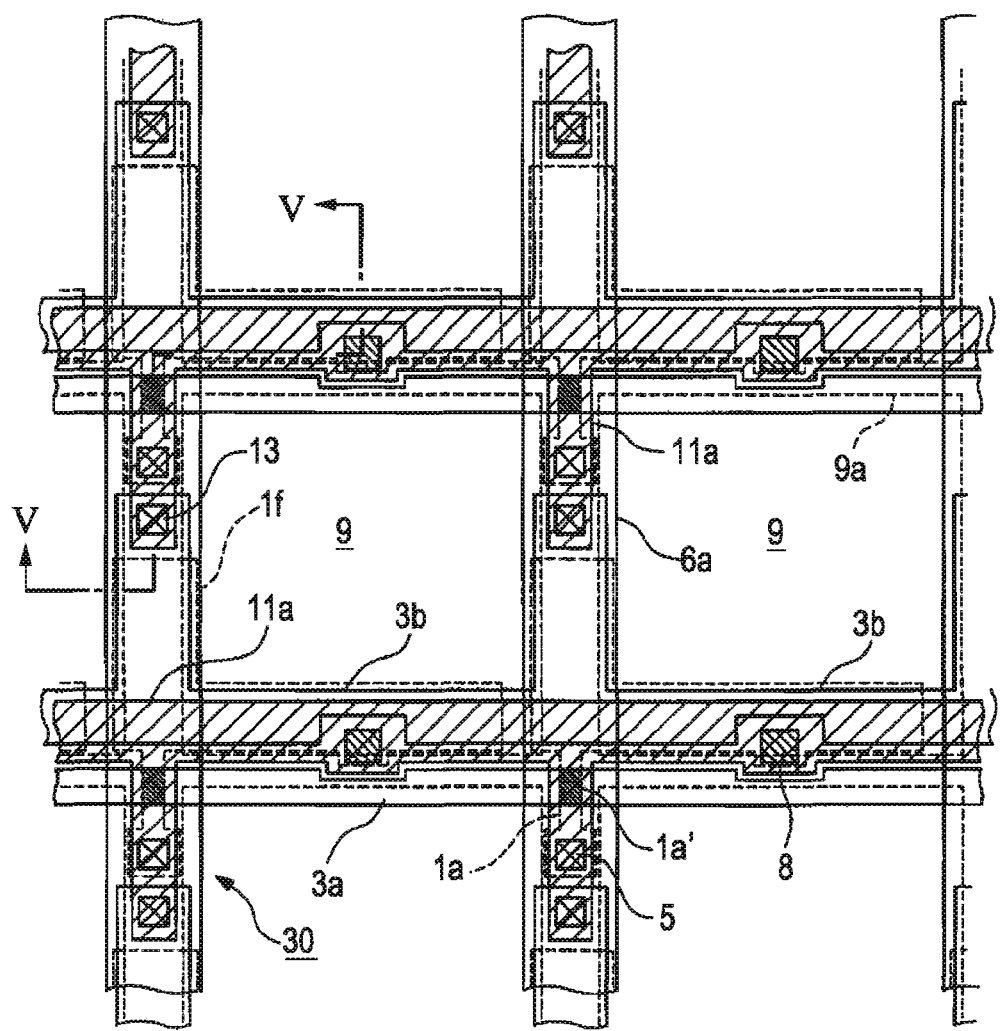
FIG. 4 is an explanatory view showing a planar structure of the liquid crystal device.

FIG. 4 is an explanatory view showing a planar structure of the light modulation area of the liquid crystal device. On the element substrate of the light modulation area, there is formed pixel electrodes 9 (outlines thereof are indicated by dotted lines 9a) having a rectangular shape and made of a transparent conductive material such as indium 4 in oxide (ITO). In addition, the data lines 6a, the scan lines 3a, and the capacitor lines 3b are formed along the crossing lines of the pixel electrodes 9. The formation area of the pixel electrodes 9 corresponds to a pixel area and the pixel electrodes 9 are formed in a structure in which it is possible to perform a light modulation for each pixel area disposed in a matrix form.

The TFT element 30 is formed around a semiconductor layer 1a formed of a polysilicon film. Data lines 6a are electrically connected to the source area (which will be described later) of the semiconductor layer 1a through a contact hole 5. Pixel electrodes 9 are electrically connected to the drain area (which will be described later) of the semiconductor layer 1a through a contact hole 5. On the other hand, channel areas 1a' are formed at areas of the semiconductor layer 1a opposite to the scan lines 3a. In addition, the scan lines 3a serve as gate electrodes at areas opposite to the channel area 1a'.

The capacitor lines 3b are formed of a main line part extending in a linear shape along the scan lines 3a (i.e., a first area formed along the scan lines 3a when seen in a plan view) and a projected part projected from a point at the intersection of the data lines 6a and the capacitor lines 3b toward a front end thereof (in a perpendicular direction in the figure) along the data lines 6a (i.e., a second area formed along the data lines 6a when seen from in a plan view). In addition, a first light blocking film 11a is formed at areas indicated by a rising diagonal stroke from bottom left to top right in FIG. 4. The projected part of the capacitor line 3b and the first light blocking film 11a are electrically connected to each other through a contact hole 13, and there is formed a storage capacitance which will be described later.

Sectional Structure

Figure 5:
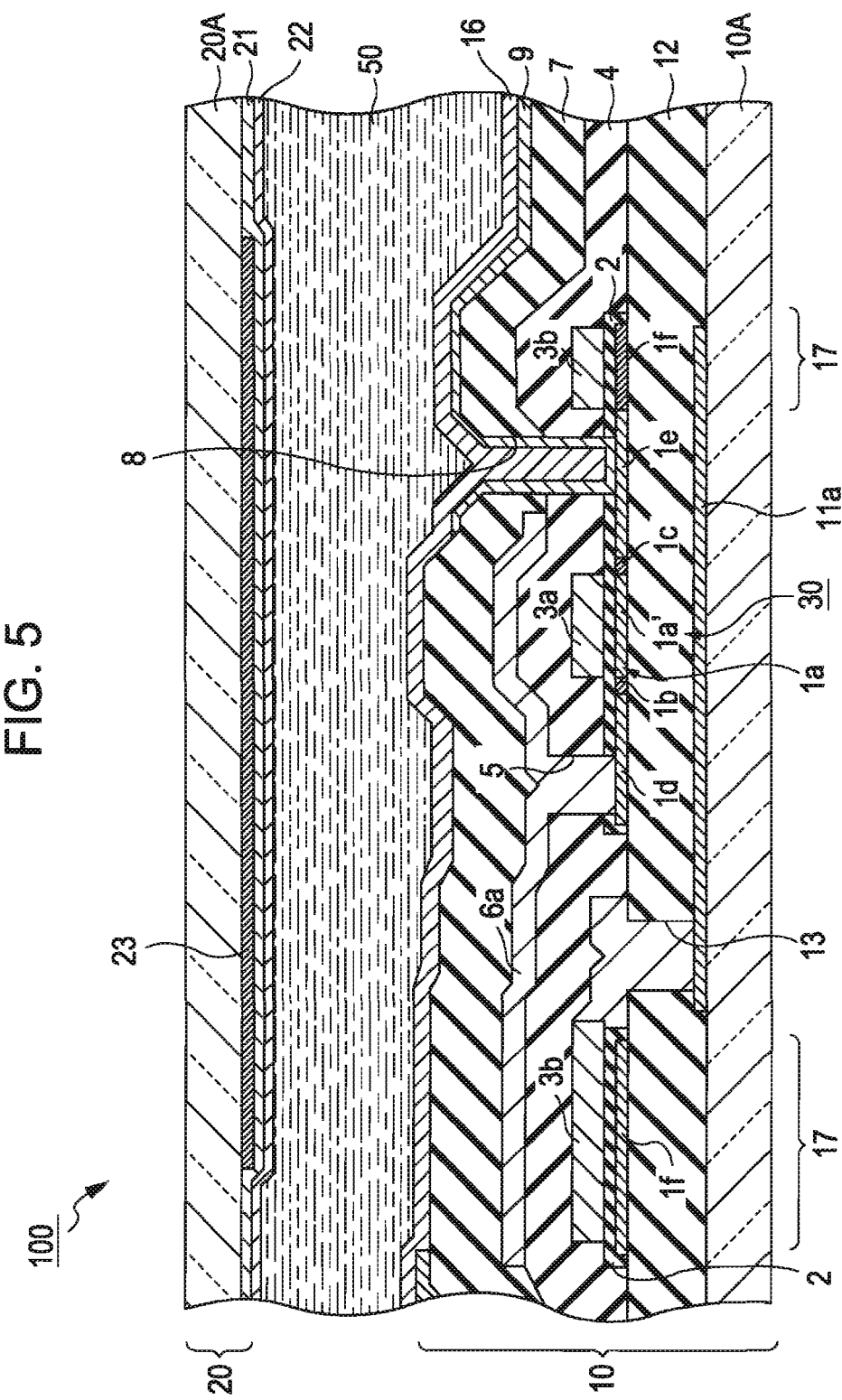
FIG. 5 is an explanatory view showing a cross-sectional structure of the liquid crystal device.

FIG. 5 is an explanatory view showing a cross-sectional structure of the liquid crystal device taken along IVA-IVA' line of FIG. 4. As shown in FIG. 5, the liquid crystal device 100 mainly includes an element substrate 10, a counter substrate 20, and a liquid crystal 50 interposed between the substrates 10 and 20.

The element substrate 10 is provided with a substrate main body 10A made of a translucent material such as a glass or quartz. On an inner surface of the substrate main body 10A, there are formed the first light blocking film 11a and a first interlayer insulating film 12 which are described later. A semiconductor layer 1a is formed on the surface of the first interlayer insulating film 12, and TFT elements 30 are formed around the semiconductor layer 1a. On areas of the semiconductor layer 1a opposite to the scan lines 3a, there is formed a channel area 1a'. A source area and a drain area are formed on both sides of the channel area 1a'. Since the TFT elements 30 are formed in a lightly doped drain (LDD) structure, highly doped areas 1d and 1e having relatively high impurity concentration and lightly doped areas 1b and 1c having relatively low impurity concentration are formed in the source area and the drain area, respectively.

A gate insulating film 2 is formed on the surface of the semiconductor layer 1a. On the surface of the gate insulating film 2, there is formed scan lines 3a, portions of which constitute gate electrodes. In addition, a second interlayer insulating film 4 is formed on the surfaces of the gate insulating film 2 and the scan lines 3a, and data lines 6a are formed on the surface of the second interlayer insulating film 4. The data lines 6a are electrically connected to the highly doped source area 1d of the semiconductor layer 1a through a contact hole 5 formed on the second interlayer film 4. In addition, a third interlayer insulating film 7 is formed on the surfaces of the second interlayer film 4 and the data lines 6a, and pixel electrodes 9 are formed on the surface of the third interlayer insulating film 7. The pixel electrodes 9 are electrically connected to the highly doped drain area 1e of the semiconductor layer 1a through a contact hole 8 formed on the second interlayer film 4 and the third interlayer film 7. On the other hand, an alignment film 16 made of a polyimide and the like is formed so as to cover the pixel electrodes 9. A rubbing process is performed on the surface of the alignment film 16 so as to anchor the orientation of the liquid crystal at the time of application of a non-selection voltage.

In addition, first storage capacitor electrodes 1f are formed by extending the semiconductor layer 1a, and a dielectric film is formed by extending the gate insulating film 2 on the surface of the first storage capacitor electrodes 1f. The capacitor lines 3b are disposed on the surface of the dielectric film. The storage capacitor 17 is formed with this arrangement.

The first light blocking film 11a is formed on the inner surface of the substrate main body 10A at a position corresponding to the formation area of the TFT element 30. The first light blocking film 11a serves to prevent light incident on the liquid crystal device 100 from intruding the semiconductor layer 1a and the like. In addition the first light blocking film 11a is electrically connected to the capacitor line 3b through a contact hole 13 formed on the first interlayer insulating film 12. With this arrangement, the first light blocking film 11a functions as a third storage capacitor electrode, and a new storage capacitor is formed between the first storage capacitor electrode 1f and the third storage capacitor electrode 11a using the first storage capacitor electrode 12 as a dielectric film.

On the other hand, the counter substrate 20 is provided with a substrate main body 20A made of a translucent material such as a glass or quartz. On an inner surface of the substrate main body 10A, there are formed a second light blocking film 23 which will be described later. In addition, on the surfaces of the substrate main body 20A and the second light blocking film 23, a common electrode 21 made of ITO and the like is formed over the entire surface. An alignment film 22 made of a polyimide and the like is formed on the surface of the common electrode 21. A rubbing process is performed on the surface of the alignment film 22 so as to anchor the orientation of the liquid crystal at the time of application of a non-selection voltage.

A liquid crystal 50 made of a nematic liquid crystal and the like is sandwiched between the element substrate 10 and the counter substrate 20. The liquid crystal 50 has positive (+) dielectric anisotropy and aligns in a direction parallel with the substrate with the application of a non-selection voltage, and aligns in a direction perpendicular to the substrate with the application of a selection voltage. By defining the anchoring direction of the alignment film 16 of the element substrate 10 to have 90° difference angle with respect to the anchoring direction of the alignment film 22 of the counter substrate 20, the liquid crystal device 100 can operate in a twisted nematic (TN) mode. Alternatively, the liquid crystal device 100 may operate in a mode such as an optical compensated bend (OCB) mode or an electrically-controlled birefringence (ECB) mode.

Liquid Crystal Storage Portion

Figure 6A:
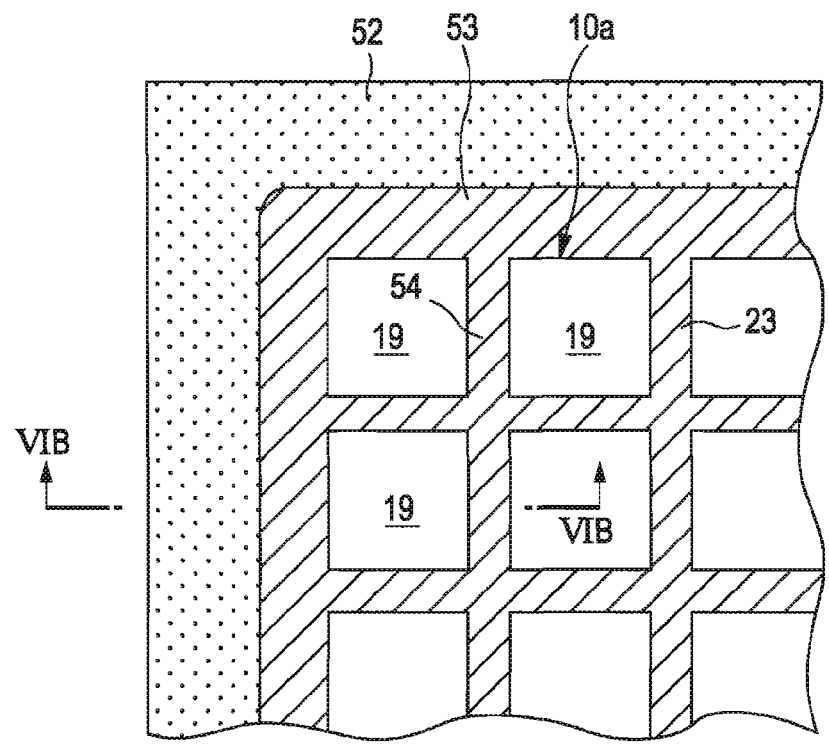
FIG. 6 is an explanatory view of a liquid crystal device according to a first embodiment of the invention.
Figure 6B:
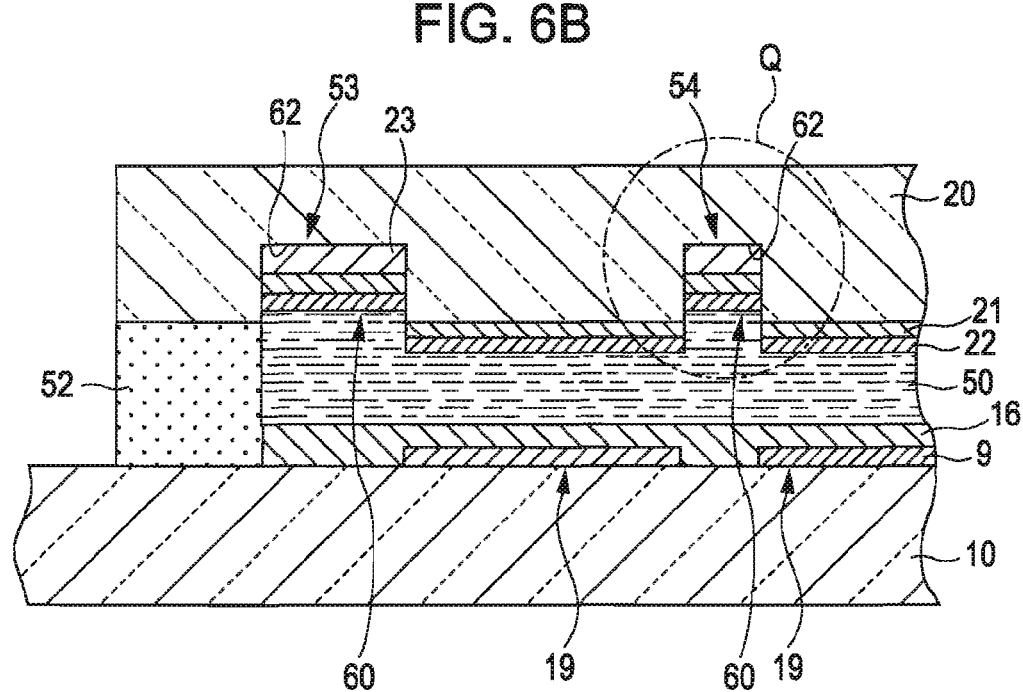

FIG. 6A is an enlarged view of 'P' part in FIG. 2, and FIG. 6B is a side cross-sectional view taken along VIB-VIB line of FIG. 6A. As shown in FIG. 6B, in the liquid crystal device according to the present embodiment, a liquid crystal storage portion 60 is formed by forming a concave portion 62 in the inner surface of the counter substrate 20 inside the inner circumference of the seal member 52.

As shown in FIG. 6A, at the circumferential portion of the area surrounded with the seal member 52, there is formed a partition part 53 which is not used for the light modulation. The partition part 53 has a broad area between the seal member 52 and the light modulation area 10a. As shown in FIG. 6B, a groove-shaped concave portion 62 is formed on the counter substrate 20 in the partition part 53. The concave portion 62 is formed by half-etching the substrate main body made of a glass material and the like using fluorinated acid and the like. In general, since the depth of the counter substrate 20 is approximately 1 mm, the concave portion 62 can be formed with a depth of approximately 100 micrometers.

In the formation area of the concave portion 62, the depth of the liquid crystal layer 50 is greater than that of the pixel area 19 on which the pixel electrodes 9 are formed. Compared to the depth of the liquid crystal layer in the pixel area 19 being in the order of several micrometers, the liquid crystal layer 50 in the formation area of the concave portion 62 can be formed to have a depth in the order of several hundred micrometers. With this arrangement, the liquid crystal storage portion 60 is formed on the surface of the counter substrate 20 in the formation area of the concave portion 62. The volume of the liquid crystal filled in the liquid crystal storage portion 60 may be 10 times of that of the liquid crystal provided to the pixel area 19. In particular, it is possible to secure the volume of the liquid crystal storage portion 60 and increase the amount of the liquid crystal encapsulated in the liquid crystal device, by forming the concave portion 62 on the partition part 53 having a broad width.

Referring back to FIG. 6A, the second light blocking film 23 is formed on the inner surface of the inner circumference of the seal member 52. In general, since the orientation of the liquid crystal is not controlled in the non-formation area of the pixel electrodes at the time of the application of the selection voltage, optical leakage occurs in the non-formation area of the pixel electrodes. The second light blocking film 23 is formed in the non-formation area of the pixel electrodes in order to prevent the optical leakage. More specifically, the second light blocking film 23 is also formed in a peripheral area 54 of the pixel area 19 arranged in a matrix form as well as addition to the partition part 53. With this arrangement, the second light blocking film 23 is formed with a grid shape.

As shown in FIG. 6B, a groove-shaped concave portion 62 extends along positions on the counter substrate 20 overlapping the second light blocking film 23. More specifically, the concave portions 62 are formed on the peripheral area 54 of the pixel area 19 as well as the partition part 53 and the second light blocking film 23 is formed on the inner surfaces of the concave portions 62. In addition, the liquid crystal storage portion 60 is formed in the formation area of the concave portions 62 on the counter substrate 20. In this way, since the liquid crystal storage portion 60 is formed at a position overlapping with the second light blocking film 23, it is possible to prevent the optical leakage by the disclination of the orientation of the liquid crystal disposed in the liquid crystal storage portion and increase the amount of the liquid crystal encapsulated in the liquid crystal device.

Alternatively, it is also possible to form the concave portion 62 on the element substrate 10 as well as or in place of the counter substrate 20. However, as shown in FIG. 4, the structure of the peripheral area of the element substrate 10 becomes complicated since the TFT element 30 or various wires are formed on the element substrate 10. As a result, the formation of the concave portion 62 is accompanied by complex design work. To the contrary, since the counter substrate 20 has a simple structure, it is possible to form the concave portion 62 without accompanying the complex design work.

Figure 7A:
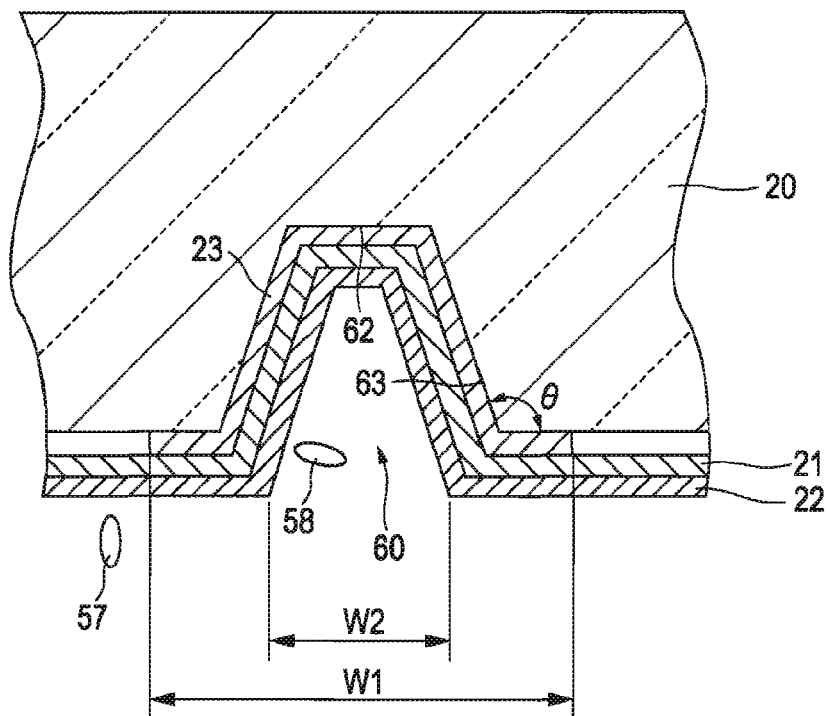
FIG. 7 is an enlarged view of 'Q' part in FIG. 6B.

FIG. 7 is an enlarged view of 'Q' part in FIG. 6B. As shown in FIG. 7A, the concave portion 62 has an approximately trapezoidal section when taken along a plane perpendicular to the extending direction of the concave portion 62. In addition, on the inner surface of the concave portion 62, the second light blocking film 23, the common electrode 21, and the alignment film 22 are formed in this order so as to form the liquid crystal storage portion 60 having an approximately trapezoidal shape.

Since the concave portion 62 has an approximately trapezoidal shape, the side surface 63 of the concave portion 62 also intersects the normal line of the counter substrate 20. Therefore, the side surface 63 of the concave portion 62 has an obtuse angle with respect to the surface of the substrate main body. With this arrangement, it is possible to enhance step coverage between layers at the time of forming the common electrode 21 and prevent short-circuiting of the common electrode 21 at each concave portion 62.

When electric field is applied to the liquid crystal from the common electrode 21, the liquid crystal molecule is oriented in a direction approximately perpendicular to the common electrode 21. In other words, the liquid crystal molecule 57 disposed in the pixel area is oriented in a direction approximately perpendicular to the counter substrate 20, and the liquid crystal molecule 58 disposed on the side surface of the liquid crystal storage portion 60 is oriented in a direction approximately in parallel with the counter substrate 20. As a result, there is a possibility of an occurrence of an optical leakage due to the disclination of the orientation of the liquid crystal in the formation area of the liquid crystal storage portion 60. To the contrary, the orientation of the liquid crystal molecule in the case of the liquid crystal storage portion 60 with an inclined side surface thereof becomes similar to that of the liquid crystal molecule 57 in comparison to that of the liquid crystal molecule in the case of the liquid crystal storage portion 60 with a vertical side surface thereof. Therefore, by using the liquid crystal storage portion 60 with an inclined side surface, it is possible to reduce the misalignment of the liquid crystal in the liquid crystal storage portion 60 and suppress the optical leakage.

Figure 7B:
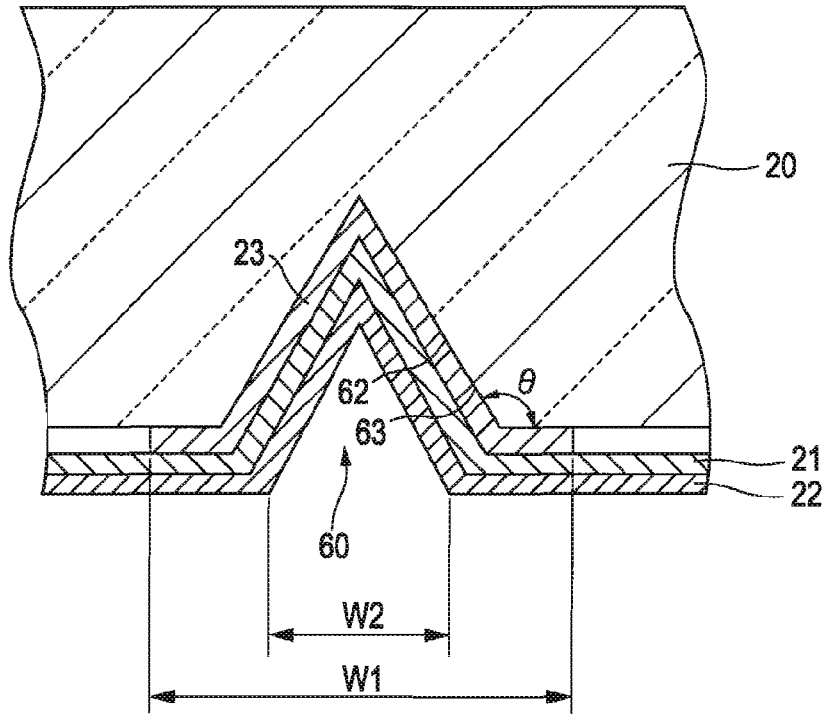

In addition, as shown in FIG. 7A, it is possible to form the concave portion 62 to have an approximately triangular side surface in place of the approximately trapezoidal side surface as shown in FIG. 7B. In this case, the side surface 63 of the concave portion 62 intersects the normal line of the counter substrate 20. In addition, the angle formed by the side surface 63 of the concave portion 62 and the surface of the substrate main body becomes greater than that of in the case of the concave portion 62 having an approximately trapezoidal cross-section. Therefore, by forming the concave portion 62 to have an approximately triangular cross-section, it is possible to enhance step coverage between layers at the time of forming the common electrode 21 and prevent short-circuiting of the common electrode 21 at each concave portion 62. In addition, it is possible to reduce the misalignment of the liquid crystal in the liquid crystal storage portion 60 and suppress the optical leakage. However, the volume of the liquid crystal storage portion 60 becomes great in the case of the concave portion 62 with a section having an approximately trapezoidal shape. In addition, the cross-sectional shape of the concave portion 62 is not limited to the approximately trapezoidal shape and the approximately triangular shape, but the concave portion 62 may have a cross-section having other shapes (for example, a semi-circular shape). Alternatively, the concave portion 62 may have a cross-section having a mixture of different shapes.

However, as described above, it is not possible to completely prevent the optical leakage even if the liquid crystal storage portion 60 is formed with an inclined side surface 63. Therefore, it is preferable to form the liquid crystal storage portion 60 on the inner surface of the formation area of the second light blocking film 23. More specifically, it is preferable to form the width W1 of the second light blocking film 23 smaller that the width W2 of the liquid crystal storage portion 60. With this arrangement, it is possible to prevent the optical leakage at and near the liquid crystal storage portion 60 and enhance contrast of an image formed by the liquid crystal device 100.

On the other hand, in the projector 800 shown in FIG. 1, it is necessary to emit high-intensity beam from the light source 810 in order to secure brightness of the color image enlarged and projected onto the screen 827. When the nigh-intensity beam is incident onto the liquid crystal device 100, the quality of the liquid crystal deteriorates due to the decomposition or polymerization of the liquid crystal. As a result, the light modulation characteristic of the liquid crystal device 100 changes, and the reliability of the projector 800 is deteriorated.

To the contrary, according to the liquid crystal device of the present embodiment shown in FIG. 6, since the liquid crystal storage portion 60 is formed by forming the concave portion 62 on the substrate 20 in the inner surface of the inner circumference of the seal member 52, it is possible to increase the amount of the liquid crystal encapsulated in the liquid crystal device 100. In addition, the liquid crystal heated by intense light or heat in an aperture portion (the pixel area) of the light modulation area and the liquid crystal within the liquid crystal storage portion formed on a non-aperture portion are interchanged by heat conduction or vibrations, it is possible to distribute the amount of light and heat transmitted to the liquid crystal 50. Therefore, it is possible to elongate the time until the entire liquid crystal 50 is deteriorated. For example, when the volume of the liquid crystal filled in the liquid crystal storage portion 60 is made 10 times that of the liquid crystal disposed in the pixel area 19, it is possible to elongate the time until the entire liquid crystal 50 is deteriorated by 10 times compared with the conventional art. With this arrangement, it is possible to enhance the reliability of the projector by 10 times. In addition, by adjusting the volume of the liquid crystal storage portion 60, it is possible to adjust the degree of enhancement in reliability of the projector.

Stirring Device

In order to interchange the liquid crystal heated by intense light or heat in the pixel area and the liquid crystal filled in the liquid crystal storage portion, it is preferable to provide a stirring device that stirs the liquid crystal. As the stirring device, piezoelectric devices 110 and 120 are mounted on the element substrate 10 or the counter substrate 20, as shown in FIG. 2A. By adopting the piezoelectric devices, a high precision stirring device can be formed in a simple manner.

Figure 8A:
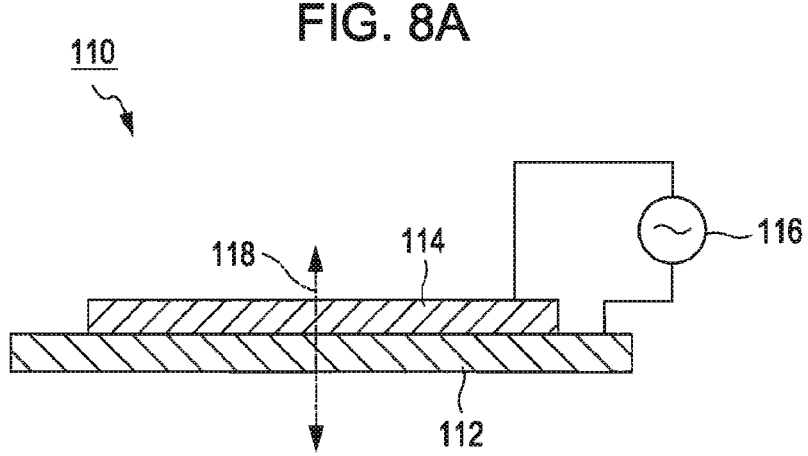
FIG. 8 is an explanatory view of a piezoelectric device.

FIG. 8 is an explanatory view of the piezoelectric device. A piezoelectric vibrating plate 110 shown in FIG. 8A can be adopted as the piezoelectric device. The piezoelectric vibrating plate 110 is formed by bonding a thin metal plate 114 onto the piezoelectric thin ceramic plate 112 polarized in a depth direction thereof. The piezoelectric thin ceramic plate 112 has a characteristic of extending and contracting with the application of alternating voltage. Therefore, by connecting the piezoelectric thin ceramic plate 112 to an alternating power source 116, it is possible to vibrate the piezoelectric vibrating plate 110 in a direction of a normal line indicated by an arrow 118.

Figure 8B:
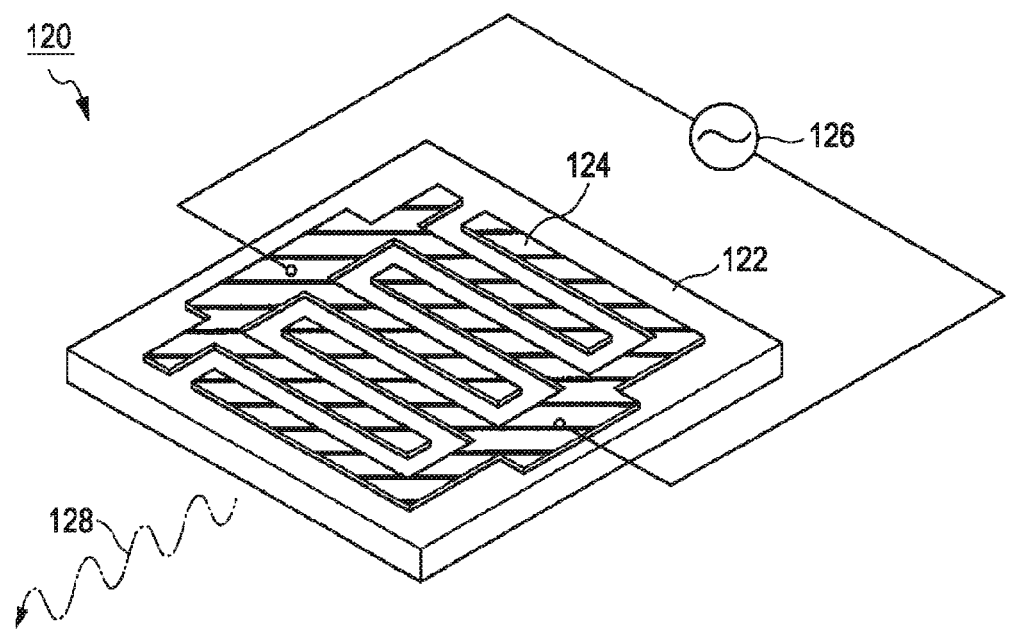

Alternatively, a surface acoustic device 120 shown in FIG. 8B may be adopted as the piezoelectric device. The surface acoustic device 120 is formed with an inter-digital electrode 124 made of a metal material and the like formed on the surface of a substrate 122 made of a piezoelectric material such as quartz and the like. The inter-digital electrode 124 is formed by alternatingly combining a pair of comb electrodes. In addition, by connecting the inter-digital electrode 124 to an alternating power source 126, it is possible to generate a surface acoustic wave 128 having a wavelength corresponding to a pitch of the comb and propagate the surface acoustic wave 128 along the surface of the substrate 122.

In addition, as shown in FIG. 2A, it is possible to vibrate the substrate by driving the piezoelectric device 110 and 120 mounted on the substrate. Then, the liquid crystal disposed between the pair of substrates start to flow along the rubbing direction of the alignment films 16 and 22, as shown in FIG. 2B. With this arrangement, it is possible to stir the liquid crystal 50 and expedite interchanging of the liquid crystal heated by intense light or heat in the pixel area and the liquid crystal filled in the liquid crystal storage portion. Accordingly, it is possible to distribute the amount of light and heat transmitted to the liquid crystal 50 and to elongate the time until the entire liquid crystal 50 is deteriorated.

In addition, as shown in FIG. 2A, it may be sufficient to provide only one piezoelectric device 110 or 120 mounted on the substrate, but it is preferable to provide a plurality of piezoelectric devices mounted on the substrate. In particular, it is possible to evenly vibrate the substrate and stir the entire liquid crystal by mounting the plurality of piezoelectric devices at symmetric positions such as four corners and the like. The stirring device may operate in a successive manner or in an intermittent manner during the operation of the projector. In addition, the stirring device may operate for a predetermined period when the projector is raised or lowered.

Deterioration Determining Device

A frame reversion driving method is generally used as a driving method of the liquid crystal device. A frame is the time until one picture plane is displayed and is typically 1/60 second. The frame reversion driving is a method of driving the liquid crystal device with application of a voltage having reverse polarity to every frame. As the liquid crystal deteriorates, the voltage holding ratio decreases and a flicker (blinking of an image) is apt to occur. The flicker occurs by twice the cycle of a frame.

Therefore, it is preferable that the projector 800 shown in FIG. 1 includes a deterioration determining device that determines the degree of deterioration of the liquid crystal and controlling the stirring device on the basis of the determination result. As the deterioration determining device, there are formed a flicker determining unit 840 and a sensor 842. The sensor 842 is provided at downstream of the light modulator. In FIG. 1, the sensor 842 is disposed between the cross dichroic prism 825 and the protecting lens 826. The sensor 842 separates three-primary color beams including red (R), green (G), and blue (B) on the basis of the wavelength thereof and measures light intensity thereof.

On the other hand, the flicker determining unit 840 outputs a driving signal of the optical modulating device for detecting the generation of the flicker. For the driving signal, it is preferable to output a uniform pattern of a certain level as a frame (flicker detection frame) having a longer period (for example, 1/20 second) than a general image display frame (1/60 second). With this arrangement, it is possible to detect the occurrence of the flicker before the flicker occurs at the time of displaying an image. The flicker determining unit 840 detect components (flicker intensity) having periods twice that of the flicker determination frame on the basis of the light intensity data for the respective wavelengths measured by the sensor 842.

For the sensor 842, a sensor which separates three-primary color beams including R, G, and B on the basis of the phase thereof and measures light intensity thereof may be used in place of the sensor which separates three-primary color beams including R, G, and B on the basis of the wavelength thereof and measures light intensity thereof. In this case, a reference clock is connected to the flicker determining unit 840 shown in FIG. 1.

Figure 9:
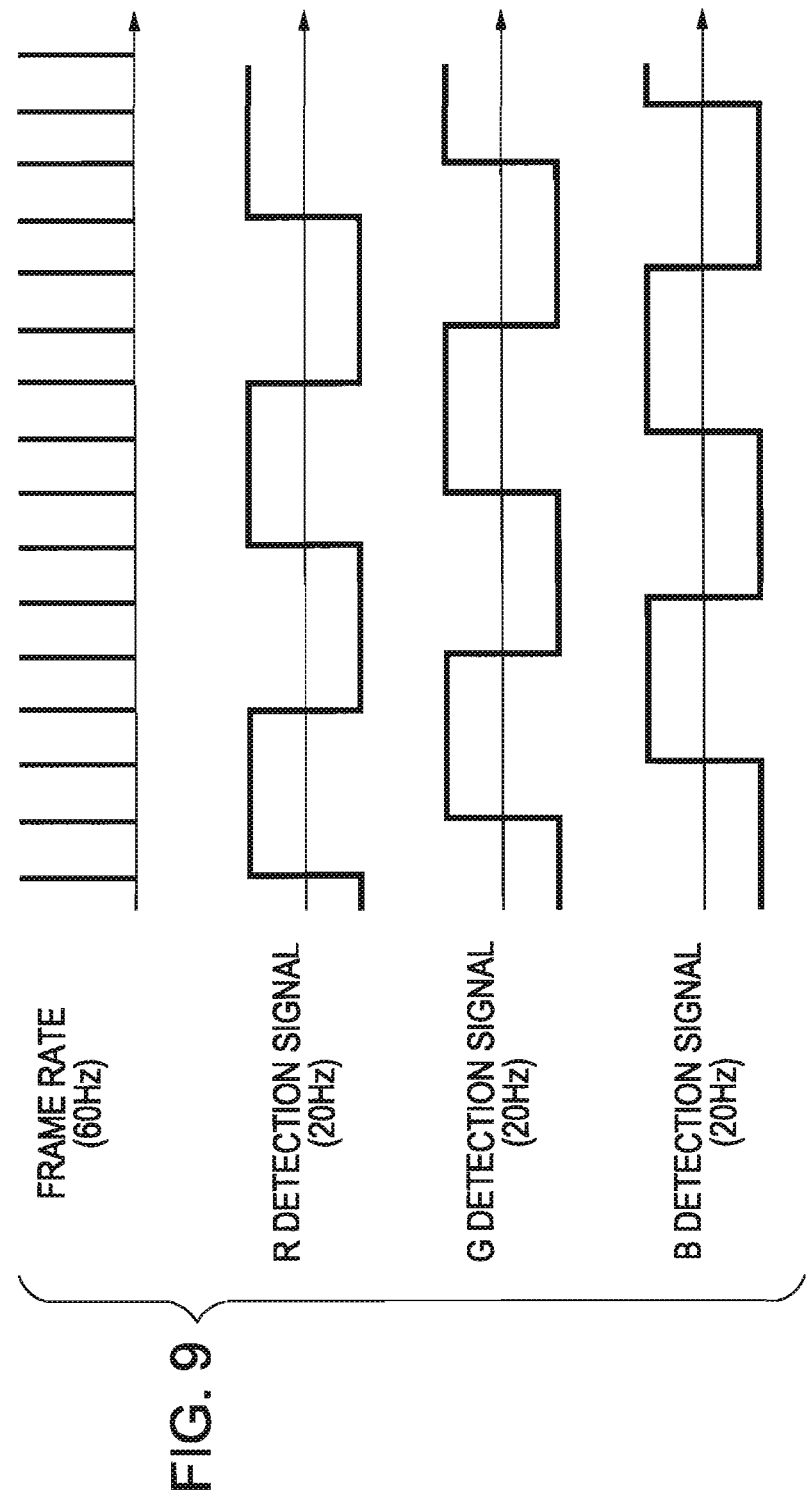
FIG. 9 is an explanatory view of a driving signal for a light modulator.

FIG. 9 is an explanatory view of a driving signal for the light modulator. In this case, the flicker determining unit 840 provides offsets between the phase of the driving signal (R detection signal) for the R light modulator, the phase of the driving signal (G detection signal) for the G light modulator, and the phase of the driving signal (B detection signal) for the B light modulator and outputs the driving signals for R, G, and B having phase offset.

Referring back to FIG. 1, the flicker determining unit 840 periodically detects the flicker intensity and compares the measured flicker intensity with the flicker intensity at the time of a shipment. When the former is greater than the latter by a certain ratio (for example, twice), it is determined that the flicker is occurred. Thereafter, a driving signal for the liquid crystal stirring device described above is output. With this arrangement, it is possible to interchange the deteriorated liquid crystal disposed in the pixel area and a new liquid crystal filled in the liquid crystal storage portion.

Since there is provided a device that determines the deterioration of liquid crystal, it is possible to interchange the liquid crystals by operating the stirring device only when the liquid crystal is deteriorated. Therefore, it is possible to elongate the time until the entire liquid crystal is deteriorated by efficiently operating the stirring device.

Furthermore, the invention is not limited to the above embodiments, and a number of alternatives, modifications, or alterations to the invention as described herein may be made within the spirit and scope of the invention. In addition, a detailed description concerning materials, constructions, and the like of a variety of components may be changed within an appropriate scope.

What is claimed is:

1. A liquid crystal device comprising:
   a first substrate;
   a second substrate;
   a stirring device that stirs the liquid crystal disposed on the first substrate or on the second substrate;
   a plurality of pixel electrodes disposed on the first substrate;
   a light modulation area including the plurality of pixel electrodes;
   a common electrode disposed on the second substrate;
   a liquid crystal disposed between the first substrate and the second substrate;

a concave portion formed in an inner surface of the second substrate, the concave portion overlapping a peripheral area of a pixel electrode of the plurality of pixel electrodes, the peripheral area being inside the light modulation area, the concave portion being non-overlapping with formation areas of the pixel electrodes, wherein the concave portion overlaps a light blocking film disposed on the inner surface of the second substrate such that a width W1 of the light blocking film is greater than a width W2 of the concave portion, and a side surface of the concave portion intersects a normal line of the second substrate.

2. The liquid crystal device according to claim 1, further comprising:

a seal member disposed around the liquid crystal, wherein the concave portion is disposed on a circumference of an area surrounded by the seal member.

3. The liquid crystal device according to claim 1, wherein the concave portion extends in a groove shape, and the concave portion has a triangular section when taken along a plane perpendicular to the extending direction of the concave portion.

4. The liquid crystal device according to claim 1, wherein the stirring device is a piezoelectric device.

5. The liquid crystal device according to claim 1, further comprising a deterioration determining device that determines a degree of deterioration of the liquid crystal and controlling the stirring device on the basis of the determination result.

6. The liquid crystal device according to claim 5, wherein the deterioration determining device determines the degree of deterioration of the liquid crystal by detecting an occurrence of a flicker.

7. The liquid crystal device according to claim 6, wherein the deterioration determining device outputs driving signals having a frame period longer than that of an image display frame.

8. A projector comprising the liquid crystal device according to claim 1.

9. The liquid crystal device according to claim 1, wherein the concave portion is disposed on the inner surface of a formation area of a light blocking film formed on the second substrate.

10. The liquid crystal device according to claim 2, further comprising a partition part, the partition part overlapping the concave portion.

* * * * *